(12) United States Patent
Roe et al.

(10) Patent No.: US 10,080,998 B2
(45) Date of Patent: *Sep. 25, 2018

(54) MACHINE AND PROCESS FOR PROVIDING A PRESSURIZED LIQUID STREAM WITH DISSOLVED GAS

(71) Applicant: Nano Gas Technologies, Inc., Deerfield, IL (US)

(72) Inventors: Cliffton Lee Roe, Harrison Township, MI (US); Scott A Fiedler, Palantine, IL (US)

(73) Assignee: Nano Gas Technologies Inc., Deerfield, IL (US)

(*) Notice: Subject to any disclaimer, the term of this patent is extended or adjusted under 35 U.S.C. 154(b) by 53 days.

This patent is subject to a terminal disclaimer.

(21) Appl. No.: 15/412,177

(22) Filed: Jan. 23, 2017

(65) Prior Publication Data
US 2017/0128895 A1 May 11, 2017

Related U.S. Application Data

(63) Continuation-in-part of application No. 14/432,817, filed as application No. PCT/US2014/064737 on Nov. 10, 2014, now Pat. No. 9,586,186.

(Continued)

(51) Int. Cl.
| | | |
|---|---|---|
| *B01F 3/04* | (2006.01) | |
| *B01F 5/00* | (2006.01) | |
| *B01F 5/06* | (2006.01) | |
| *C02F 1/68* | (2006.01) | |
| *C02F 7/00* | (2006.01) | |

(Continued)

(52) U.S. Cl.
CPC .............. *B01F 5/0647* (2013.01); *B01F 3/04* (2013.01); *B01F 3/0446* (2013.01); *B01F 3/04503* (2013.01); *B01F 3/04737* (2013.01); *B01F 5/00* (2013.01); *B01F 5/04* (2013.01); *B01F 5/0413* (2013.01); *B01F 5/0655* (2013.01); *B01F 15/06* (2013.01); *C02F 1/24* (2013.01); *C02F 1/685* (2013.01); *C02F 1/727* (2013.01); *C02F 3/22* (2013.01); *C02F 7/00* (2013.01); *B01F 2215/0422* (2013.01); *B01F 2215/0431* (2013.01); *B01F 2215/0459* (2013.01); *B01F 2215/0468* (2013.01); *C02F 1/74* (2013.01); *C02F 1/78* (2013.01); *C02F 3/24* (2013.01); *C02F 2101/32* (2013.01); *C02F 2103/007* (2013.01); *C02F 2103/10* (2013.01); *C02F 2103/365* (2013.01); *C02F 2301/022* (2013.01); *C02F 2301/024* (2013.01); *Y02W 10/15* (2015.05)

(58) Field of Classification Search
CPC ...... B01F 5/0647; B01F 3/04; B01F 3/04503; B01F 5/00
IPC .......................................................... B01F 3/04
See application file for complete search history.

(56) References Cited

U.S. PATENT DOCUMENTS

| | | | | |
|---|---|---|---|---|
| 4,652,382 | A * | 3/1987 | Edwards | .................... C02F 1/78 210/197 |
| 6,332,980 | B1 * | 12/2001 | Moorehead | ............... C02F 1/38 210/104 |
| 2010/0276819 | A1 * | 11/2010 | Teng | .................... A61H 33/027 261/31 |

* cited by examiner

Primary Examiner — Robert A Hopkins (57) ABSTRACT

A machine and process for providing a gas liquid mixture are described. The process can include providing a pressurized fluid stream; and subjecting the fluid stream to a series of alternating flow regions that include a plurality of laminar flow regions and turbulent flow regions. The machine can include a flow path from a pressure vessel to an ejection point, where the flow path includes a plurality of alternating flow characteristic regions.

19 Claims, 5 Drawing Sheets

Related U.S. Application Data (60) Provisional application No. 61/904,755, filed on Nov. 15, 2013.

(51) Int. Cl.
| | |
|---|---|
| *B01F 15/06* | (2006.01) |
| *B01F 5/04* | (2006.01) |
| *C02F 1/24* | (2006.01) |
| *C02F 1/72* | (2006.01) |
| *C02F 3/22* | (2006.01) |
| *C02F 1/74* | (2006.01) |
| *C02F 1/78* | (2006.01) |
| *C02F 101/32* | (2006.01) |
| *C02F 103/00* | (2006.01) |
| *C02F 3/24* | (2006.01) |
| *C02F 103/10* | (2006.01) |
| *C02F 103/36* | (2006.01) |

MACHINE AND PROCESS FOR PROVIDING A PRESSURIZED LIQUID STREAM WITH DISSOLVED GAS

CROSS-REFERENCE TO RELATED APPLICATIONS

This disclosure claims the benefit of priority to U.S. application Ser. No. 14/432,817, filed Apr. 1, 2015, which claims priority to PCT international patent application number PCT/US14/64727, filed Nov. 10, 2014, which claims priority to US Provisional Patent Application No. 61/904,755, filed Nov. 15, 2013, the disclosures of which are incorporated herein in their entirety.

FIELD OF THE INVENTION

The present disclosure relates to providing a liquid, particularly an aqueous fluid, saturated with a gas.

BACKGROUND

Systems are known that make use of liquids enriched with a gas. For example, U.S. Pat. No. 2,713,026 to Kelly et al. appears to disclose the use of a gas-enriched fluid for wastewater treatment, and in particular the introduction of an air-supersaturated fluid into a pool of wastewater to suspend solids in the wastewater and facilitate their removal. Another example is U.S. Pat. No. 4,192,742 to Bernard et al., which appears to teach that the biodegradation of wastewater can be promoted by treating the wastewater within a treatment chamber maintained at a pressure above atmospheric pressure to achieve super oxygenation of the wastewater.

Methods and equipment for enriching a liquid with a gas are also known. For example, U.S. Pat. No. 3,957,585 to Malick appears to disclose that atomized liquid can be introduced into a reaction zone to effect intimate contact of the atomized liquid with a gas phase. A particular type of atomizing spray head for this purpose is disclosed in U.S. patent application Ser. No. 13/602,793 to Eppink et al., filed Sep. 4, 2012, whose contents are fully incorporated herein by reference ("Eppink"). As explained in Eppink, such spray heads are adapted to introduce an atomized fluid (for example, potable water or sewage water) into a chamber containing oxygen at a high pressure, with the result that the fluid becomes saturated with oxygen. The oxygen-saturated fluid can then be introduced into a stream of wastewater with the result that the wastewater contains sufficiently high levels of oxygen to promote the activity of aerobic microorganisms capable of biodegrading waste in the wastewater.

U.S. Pat. Nos. 7,008,535 and 7,294,278, each to Spears et al., appear to disclose that a gas-supersaturated fluid can be introduced into a wastewater so that the gas-supersaturated liquid is introduced in a substantially bubble-free manner. For this purpose, Spears discloses the use of one or more fluid exit nozzles containing capillaries through which the gas-supersaturated liquid can be injected into the wastewater. U.S. Pat. No. 7,294,278 to Spears et al. discloses capillaries having diameters of about 150 to about 450 micrometers in nozzles having a plate-like construction, and capillary diameters of about 0.005 inch (about 125 micrometers) in nozzles having a more conventional spray head-type configuration. A drawback of the capillaries is that they may be prone to becoming plugged by solids and reaction products that may be entrained within the gas-supersaturated fluid.

SUMMARY

In one embodiment, a liquid-gas saturation machine includes a pressure vessel that includes, above a mid-line, a gas nozzle adapted for the addition of a gas to an interior volume of the pressure vessel and a liquid atomizer adapted for the addition of a liquid to the interior volume of the pressure vessel; below the mid-line, a fluid outlet positioned above a bottom of the pressure vessel and a clean-out port positioned at or adjacent to the bottom of the pressure vessel; and a means for determining a fluid level within the interior volume of the pressure vessel; and a flow path fluidly connected to the fluid outlet, the flow path including a plurality of alternating flow characteristic regions, wherein the alternating flow characteristic regions are laminar flow regions and turbulent or transitional flow regions, wherein the alternating flow characteristic regions are distinguished by a Reynolds number value of at least about 500.

In another embodiment, a process includes providing a pressurized fluid stream that includes a mixture of a gas and a liquid; subjecting the fluid stream to at least 5 of alternating flow regions that include a plurality of laminar flow regions and turbulent flow regions; wherein the laminar flow regions and turbulent flow regions are distinguished by their respective calculated Reynolds numbers which differ by at least 500.

BRIEF DESCRIPTION OF THE FIGURES

For a more complete understanding of the disclosure, reference should be made to the following detailed description and accompanying drawing figures wherein.

While specific embodiments are illustrated in the figures, with the understanding that the disclosure is intended to be illustrative, these embodiments are not intended to limit the invention described and illustrated herein.

DETAILED DESCRIPTION

A first embodiment is a liquid-gas saturation machine that includes a flow path having a plurality of alternating flow characteristic regions, preferably a plurality of flow path each having a plurality of alternating flow characteristic regions. The machine, preferably, includes a pressure vessel upstream of the flow path having the alternating low characteristic regions. The pressure vessel can include, above a mid-line, a gas nozzle adapted for the addition of a gas to an interior volume of the pressure vessel and a liquid atomizer adapted for the addition of a liquid to the interior volume of the pressure vessel; and, below the mid-line, a fluid outlet positioned above a bottom of the pressure vessel and a clean-out port positioned at or adjacent to the bottom of the pressure vessel. The mid-line of the pressure vessel determined by the approximate meniscus line of water that fills 50% of the pressure vessel. Preferably, the pressure vessel further includes a means for determining a fluid level within the interior volume of the pressure vessel. The means for determining the fluid level can include a calibrated scale, load cell, or strain gauge (e.g., for when the density of the fluids within the pressure vessel is known), a view port or sight glass, a magnetic level gauge, a capacitance transmitter, a magnetostrictive level transmitter, an ultrasonic level transmitter, a laser level transmitter, a radar level transmitter, or a combination thereof.

The flow path is fluidly connected to the fluid outlet and includes a plurality of alternating flow characteristic regions. The alternating flow characteristic regions can be selected from the group consisting of a region adapted to provide laminar flow, a region adapted to provide transitional flow, and a region adapted to provide turbulent flow. In one preferable example, the alternating flow characteristic regions are regions adapted to provide laminar flow and regions adapted to provide turbulent flow. Without limitation on which region precedes the other as determined from the pressure vessel, the flow path can include a laminar flow region, then a turbulent flow region, then a laminar flow region, and then a turbulent flow region. In one preferable example, a laminar flow region precedes any turbulent flow region from the pressure vessel.

The alternating flow characteristic regions can include at least two distinct flow regions distinguished by a Reynolds number value. The difference in the Reynolds numbers between the two distinct flow regions can be at least about 500, 1000, 1500, or 2000.

In one instance, the liquid-gas saturation machine can include a plurality of flow paths, for example, the machine can include 2, 3, 4, 5, 6, 7, 8, 9, or 10 flow paths. Preferably, the flow paths are constructed to be identical or nearly identical. In one example, the plurality of flow paths is provided by a plurality of tubes; for example, the machine can include at least 2, 3, 4, 5, 6, 7, 8, 9, or 10 tubes in a parallel arrangement, preferably the machine includes 2, 3, 4, 5, 6, 7, 8, 9, or 10 tubes in parallel arrangement. In a preferable example, this plurality of tubes includes a series of tubes that are approximately identical; that is, individually, have about the same length and the same spacing of flow regions.

In a preferable instance, the alternating flow characteristic regions are equally spaced along the flow path. Herein, equally spaced means that each of the flow characteristic regions have approximately the same length.

Figure 8:
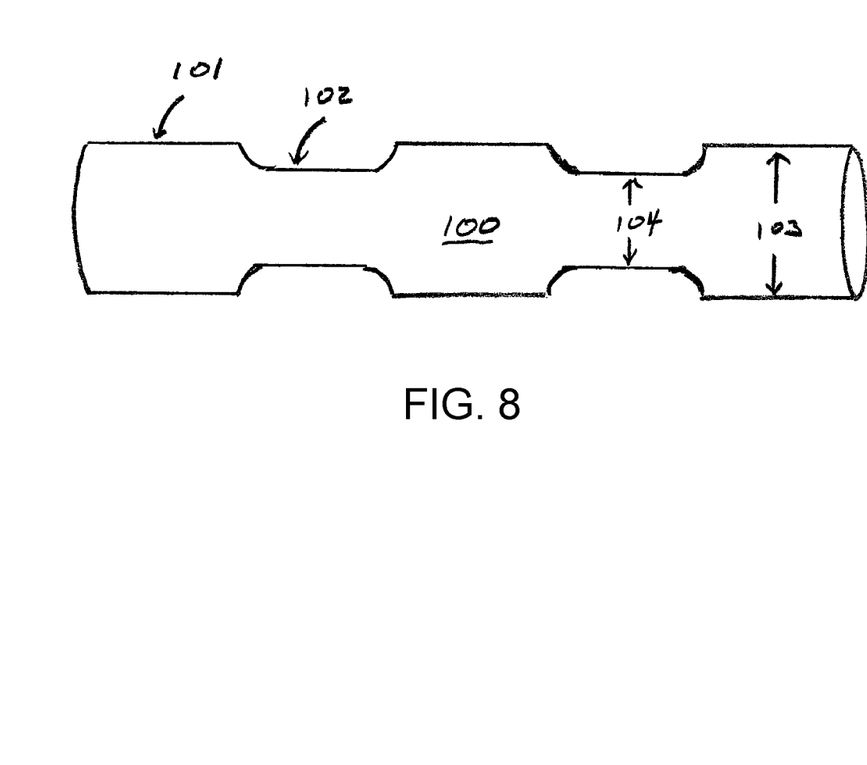
FIG. 8 is a schematic of a flow path within a liner tube that contains a plurality of alternating flow regions with differing internal diameters.

In another instance, the flow path is provided by a tube. The tube can be of unitary construction (e.g., manufactured from a single piece) or can be assembled for a plurality of distinct parts wherein the parts join without creating joint specific turbulent flow (e.g., the joints preferable are free of physical shapes that create turbulence in a flowing liquid). The tube is preferable made of stainless steel (e.g., 300 series stainless steel; more preferably 304 stainless steel, or a marine grade stainless steel (e.g., 316 or 317 stainless steel)). In preferable examples, the tube that has an approximately constant internal diameter, or a constant internal diameter. In preferable examples, the tube can include an internal diameter (ID) of about 0.5 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, or about 0.5 mm to about 2 mm, about 1 mm to about 2 mm, about 2 mm to about 25 mm, about 5 mm to about 20 mm, or about 10 mm to about 15 mm. In other examples, the tube may include variable ID wherein the largest and smallest ID are within the range of about 1 mm to about 25 mm, about 2 mm to about 20 mm, or about 5 mm to about 15 mm. In still other examples, the tube may include a taper from a tube inlet to a tube outlet. In one instance, the tube includes a larger ID at the inlet and a smaller ID at the outlet, where a change from the inlet ID to the outlet ID is consistent along the length of the tube. In another example (e.g., FIG. 8), the tube 100 includes an alternating internal diameter; the alternating internal diameter varies between a first internal diameter 103 and a second internal diameter 104 along the length of the tube. In one instance, the tube 100 is a linear tube (e.g., 6 feet in length) having regularly spaced constrictions 102 that have a more narrow internal diameter 104 (small internal diameter). In one instance, the tube includes constrictions every about 50 mm, about 100 mm, about 150 mm, about 200 mm, or about 250 mm; preferably, the constriction has a length less than about half the spacing of the consecutive constrictions. For example, if the constriction is spaced every 200 mm, then the length of the constriction is less than 100 mm. Notably, the distance between constrictions is measured from the end of one constriction to the start of the next, alternatively the distance is the length of the portion of the tube having a greater ID 101.

The tube, preferably, includes an inlet section fluidly connected to the fluid outlet, an alternating series of bent and straight sections fluidly connected to the inlet section, and an outlet section fluidly connected to the alternating series of bent and straight sections. In one instance, the bent sections are adapted to provide turbulent or transitional flow, and the straight sections are adapted to provide laminar flow. In another instance, the bent sections are adapted to provide a bent section flow Reynolds number, the straight sections are adapted to provide a straight section flow Reynolds number, and where the bent section flow Reynolds number is at least 500 greater than the straight section flow Reynolds number.

In one example of the flow path, the inlet section and the outlet section of the tube are parallel. That is, the flow within the inlet section and the outlet section is either co-directional or 180° opposed; preferably, the flow within the sections is co-directional.

In another example, the machine includes a treatment region that provides a stabilizing effect on the gas liquid admixtures that are passed therethrough. The treatment region includes the alternating series of bent and straight sections, a portion of the inlet section, and a portion of the outlet section. In one instance, the portions of the inlet and outlet sections overlap in the treatment region.

Figure 1A:
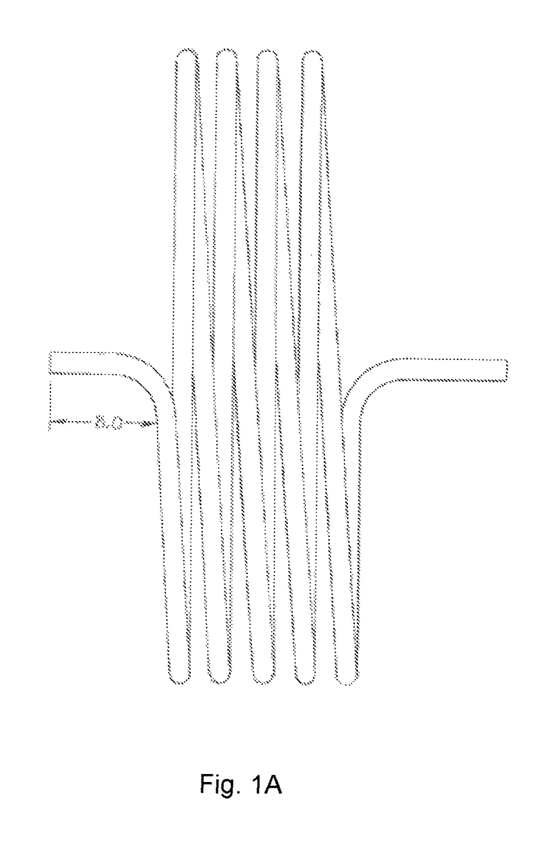
FIG. 1A and FIG. 1B are front and side schematics of flow path within a tube which contains a plurality of alternating flow regions with a change in direction of the flow between lamellar sections of about 205°.
Figure 1B:
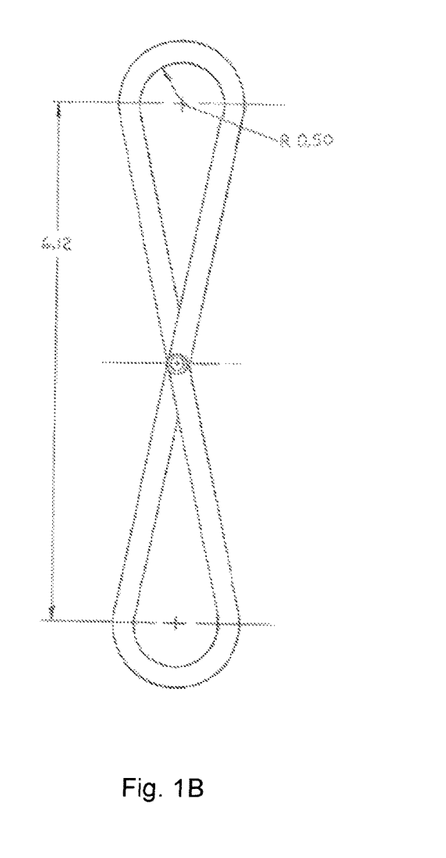
Figure 2A:
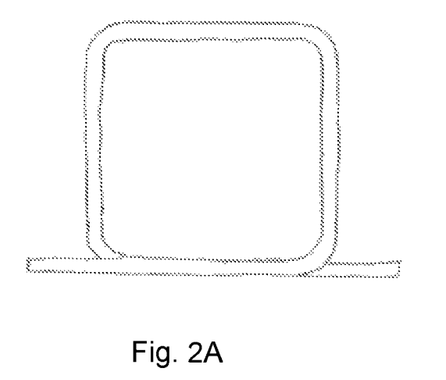
FIG. 2A and FIG. 2B are front and side schematics of flow path within a tube which contains a plurality of alternating flow regions with a change in direction of the flow between lamellar sections of about 90°.
Figure 2B:
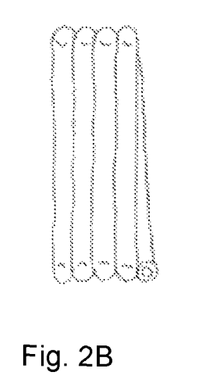
Figure 3A:
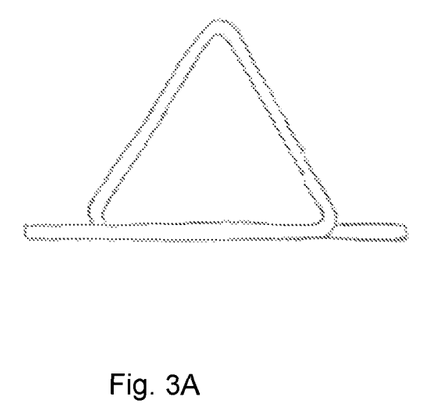
FIG. 3A and FIG. 3B are front and side schematics of flow path within a tube which contains a plurality of alternating flow regions with a change in direction of the flow between lamellar sections of about 135°.
Figure 3B:
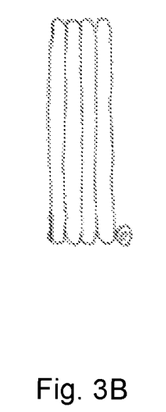
Figure 4A:
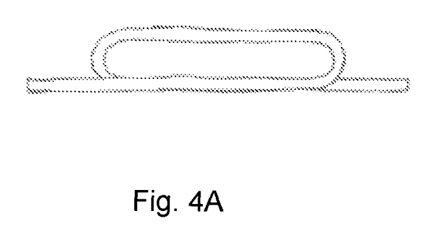
FIG. 4A and FIG. 4B are front and side schematics of flow path within a tube which contains a plurality of alternating flow regions with a change in direction of the flow between lamellar sections of about 180°.
Figure 4B:
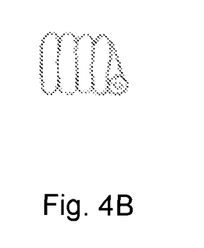
Figure 5A:
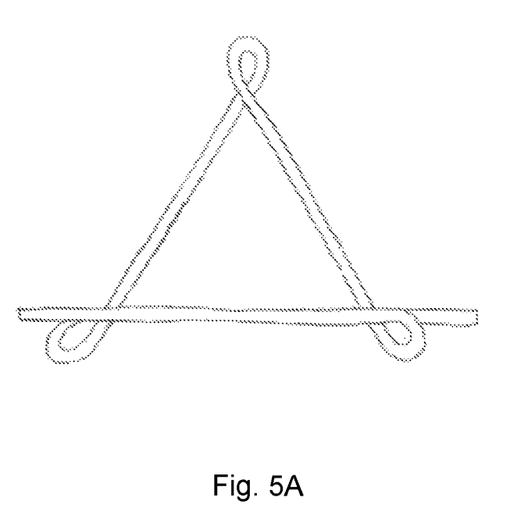
FIG. 5A and FIG. 5B are front and side schematics of flow path within a tube which contains a plurality of alternating flow regions with a change in direction of the flow between lamellar sections of about 240°.
Figure 5B:
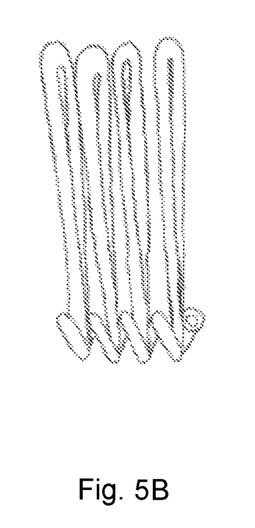
Figure 6A:
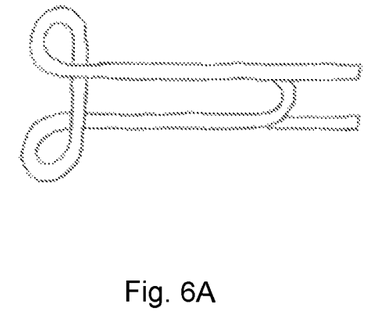
FIG. 6A and FIG. 6B are front and side schematics of flow path within a tube which contains a plurality of alternating flow regions with a plurality of changes in direction of the flow between lamellar sections of about 180° and about 270°.
Figure 6B:
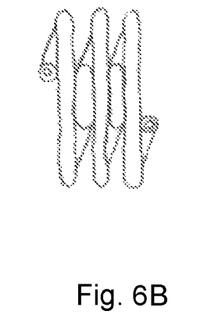
Figure 7A:
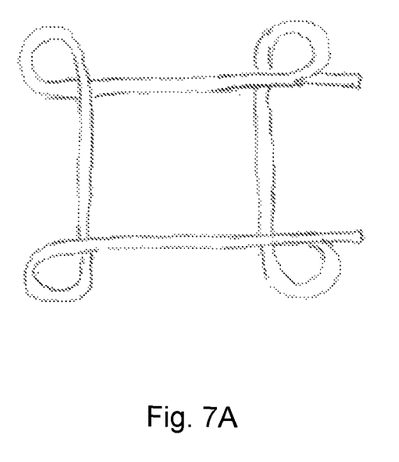
FIG. 7A and FIG. 7B are front and side schematics of flow path within a tube which contains a plurality of alternating flow regions with a change in direction of the flow between lamellar sections of about 270°.
Figure 7B:
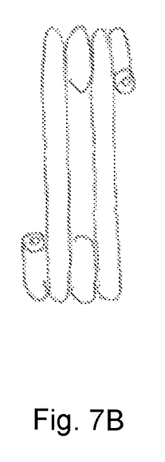

With reference to the figures, the flow path through adjoining laminar sections about a bent section undergoes a change of direction of at least 60°, preferably 90°, more preferably 180°. A total change of direction of flow (through a bent section adjoining laminar sections) can be in excess of 360°. For example, a laminar sections can adjoin a bent section that includes a 360°+ change of direction (e.g., a coil), where the machine would include a plurality of coils (bent sections) adjoined by laminar flow regions (straight sections). Preferably, the bent sections affect a total change in direction of a flow though adjoining laminar sections that is less than 360° (see FIGS. 1-7). The change in direction of flow is the angle between adjoining laminar sections, e.g., the angle between the in-flow laminar section and the corresponding out-flow laminar section. In one instance, the change of direction is about 60 to about 270 degrees, about 90 to about 225 degrees, or about 180 to about 240 degrees. In particularly preferable instances, the degree of change of direction of flow is about 60° (an acute angle to the incident flow), about 90° (a right angle to the incident flow; FIG. 2), about 135° (an obtuse angle to the incident flow; FIG. 3), about 180° (parallel to the incident flow with a reversal in direction; FIG. 4), about 205° (FIG. 1), about 240° (a reflex angle to the incident flow; FIG. 5), or about 270° (FIG. 7). In another instance, the treatment region can include a plurality of sections that include multiple changes in direction (identifiable based on the angle of change. For example (FIG. 6), the treatment region can include a change of direction of 180° and a plurality of changes in direction of 270°.

The machine, preferably, includes a plurality of alternating regions (e.g., determined by the number of bent regions between straight sections). The plurality of alternating regions, preferable, includes at least 5, at least 10, at least 15, at least 20, or at least 25 alternating regions. In a preferable instance, the machine includes 5, 6, 7, 8, 9, 10, 11, 12, 13, 14, 15, 16, 17, 18, 19, 20, 21, 22, 23, 24, 25, 26, 27, 28, 29, or 30 alternating regions. In reference to the figures, FIG. 1A includes 4.5 alternating regions (determined from the input flow to a point where the flow returns to the input flow direction (travels, in this instance, 360°).

The machine, typically, further includes a liquid, a gas, and a mixture of the liquid and the gas positioned within the pressure vessel. Preferably, the mid-line of the pressure vessel is determined by the approximate meniscus line of a liquid that fills 50% of the pressure vessel. When the lower volume is occupied by a mixture of the liquid and the gas, the upper volume can include a plurality of droplets of the liquid in an atmosphere that consists of the gas. The droplets of the liquid can have an average diameter of less than 0.1 mm, less than 0.05 mm, less than 0.01 mm, or less than 0.005 mm. The upper volume can further include the gas at a pressure greater than about 50 psi, 60 psi, 70 psi, 80 psi, 90 psi, 100 psi, 150 psi, 200 psi, 250 psi, or 300 psi. In this example, the lower volume, positioned below the mid-line, can include a near saturated or saturated mixture of the gas and the liquid. Herein, the term saturated has its commonly understood meaning in the chemical arts; that is, a saturated solution, at a specific temperature and pressure, includes the maximum amount of solute (e.g., the gas) capable of being carried by the solvent (e.g., the liquid). Notably, when gas and liquid mixtures are considered the saturation point of a solvent is pressure dependent. Preferably, the gas and liquid mixture is not super-saturated; the term super-saturated as used herein has its commonly understood meaning in the chemical arts, for example, a super saturated solution is out of equilibrium. When gas and liquids are considered, super-saturated solutions typically effloresce. Preferably, the saturated mixture of the gas and the liquid is substantially free of bubbles.

In a preferable embodiment, the liquid carried in the pressure vessel and the flow path is water. The water can be distilled water, well water, recovered water, waste water, brine, salt water, or a mixture thereof.

In a preferable embodiment, the gas carried in the pressure vessel and the flow path includes at least 50%, 60%, 70%, 80%, or 90% oxygen. Preferably, the gas includes at least 80%, or at least 90% oxygen. More preferably, the gas consists essentially of oxygen, that is, the gas has an oxygen content of 99% or more. Even more preferably, the machine further includes an oxygen concentrator (e.g., a vacuum swing adsorption unit) and the gas carried in the pressure vessel is the product of the oxygen concentrator.

Regarding the gas nozzle and the liquid atomizer, these can be contained in a single unit, can be separate, or can include combined gas/liquid injectors and separate gas and or liquid injectors. In one preferable embodiment, the gas nozzle and liquid atomizer and combined in a venturi nozzle.

Another preferable aspect of the machine is a means for maintaining a temperature of the flow path. The temperature of the flow path can be maintained by, for example, a refrigeration device, a temperature control bath, a circulating heater/chiller, and/or immersing the flow path in a reservoir (e.g., a reservoir where the liquid is drawn from or where the flow path end).

Yet another aspect of the machine is a degasification apparatus. Preferably, the machine includes degasification apparatus upstream of the liquid atomizer; that is, a liquid provided to the liquid atomizer is preferable degased.

Another embodiment is the operation of the machine described above. The operation of the machine can include providing a fluid stream, which exits the flow path and includes a mixture of gas and the liquid, to a receiving volume without the generation of bubbles in the receiving volume.

Still another embodiment is a process that includes providing a pressurized fluid stream which includes a mixture of a gas and a liquid, and then subjecting the fluid stream to a series of alternating flow regions which include a plurality of laminar flow regions and turbulent flow regions. Optionally, dividing the pressurized fluid stream into a plurality of fluid streams and passing each through a plurality of equally-spaced laminar flow regions and turbulent flow regions. Preferably, the laminar flow regions and turbulent flow regions are distinguished by their respective calculated Reynolds numbers which differ by at least 500, 1000, 1500, or 2000. More preferably, there are at least about 5, 10, 15, 20, or 25 alternating flow regions, as determined by the number of turbulent flow regions.

The process can include a pressurized fluid stream that is a substantially saturated or saturated mixture of the gas and the liquid. That is, the pressurized fluid stream includes a concentration of the gas (solute) in the liquid (solvent) that is at or is about equal to the theoretical concentration of the gas in the liquid at the temperature and pressure of the fluid stream. Preferably, the pressure and temperature of the fluid stream is determined at a point where the series of alternating flow regions begin. In another instance, the pressurized fluid stream, at the point where the series of alternating flow regions begin, is below the theoretical saturation point and the pressurized fluid stream at a point where the series of alternating flow regions ends is substantially saturated or saturated.

Preferably, the pressurized fluid stream when entering the series of alternating flow regions and when exiting these flow regions is substantially free of bubbles. That is, the fluid mixture within a tube, pipe, or conduit carrying the pressurized fluid stream is substantially free of bubbles with a diameter of greater than 1 mm, 500 micron, 250 micron, 100 micron, 50 micron, 25 micron, 10 micron, 5 micron, 1 micron, 500 nm, 250 nm, or 100 nm. In one instance, the pressurized fluid stream, when exiting the flow regions, includes a plurality of nanobubbles that have a diameter of less than 250 nm, 200 nm, 150 nm, or 100 nm. In a preferable instance, the pressurized fluid stream includes a saturated solution of the solute and solvent and a plurality of nanobubbles of the gas (solute) (i.e., a nanobubble fluid stream), where the nanobubbles have a mean-bubble diameter of less than 200 nm, 150 nm, or 100 nm.

The pressurized fluid stream includes both a gas and a liquid (a solute and a solvent). While any gas/liquid combination is envisioned, a preferable liquid is water, including distilled water, bilge water, waste water, produced water, brine, salt water, or combinations thereof. In a preferable example, the process is employed to increase the gas content of a liquid stored in a liquid reservoir and, preferably, the liquid of the pressurized fluid stream is drawn from the liquid reservoir. The gas can be selected from the group consisting of oxygen, ozone, nitrogen, carbon dioxide, carbon monoxide, hydrogen, methane, ethane, ethylene, propane, propene, butane, n-butene, iso-butene, and a mixture thereof. In one preferable example, the gas is oxygen or a mixture of oxygen and another gas, more preferably the gas includes at least 50% oxygen. In one instance of this example the gas (e.g., the oxygen) can be provided by an oxygen concentrator (e.g., a vacuum swing adsorption unit).

In another preferred example, the process is employed to increase the gas content of a liquid stored in a liquid reservoir and includes providing the fluid stream to the fluid reservoir. Where the liquid reservoir includes the liquid, preferable, consists essentially of the liquid. Herein, the liquid reservoir can be a steam, river, pond, lake, sea, ocean, or man-made pond, waste treatment reservoir, barrel, or other volume of liquid. In a preferable instance, the reservoir is a man-made or natural pond, in another instance the reservoir is a body of water used for aquatic farming (e.g., fish farming), in still another instance the reservoir is a polluted natural body of water (e.g., steam, river, lake). In yet another instance, the reservoir is or includes at least 75 wt. % water, that is the composition of the solution that fills the reservoir (or the reservoir solution) is at least 75 wt. % water, preferable at least 80 wt. %, 85 wt. %, 90 wt. %, or 95 wt. % water.

Preferably, the fluid stream provided to the reservoir has the same or about the same temperature as the point in the reservoir where the fluid stream is being provided. In one instance, the temperature of the fluid stream and the temperature of the reservoir are equilibrated such that a temperature differential between the fluid stream and the reservoir at a location where the fluid stream is provided to the reservoir is less than about 5, 4, 3, 2, or 1° C. In one example, the fluid stream is cooled (e.g., by a refrigeration unit, or a chilled water bath). In another example, the fluid stream is contained in a conduit within the reservoir, preferably wherein the plurality of flow regions are within the reservoir.

In yet another embodiment, the available oxygen content in a water reclamation pond is increased by first spraying clean water or recovered waste water into a pressure vessel that includes an atmosphere of oxygen at a pressure of at least 50, 75, 100, 150, or 200 psi thereby providing a fluid stream that includes the water or recovered waste water saturated with the oxygen, the fluid stream further including a concentration of oxygen in the saturated water or recovered waste water (g/L). Then, passing the fluid stream from the pressure vessel through a tube that includes an inlet section fluidly connected to the pressure vessel. Next, passing the fluid stream through an alternating series of bent and straight sections fluidly connected to the inlet section, and then through an outlet section fluidly connected to the alternating series of bent and straight sections. The fluid stream is then diluted without bubble nucleation; for example, wherein the fluid stream is diluted with a waste water stream. Finally, the process provides an increased waste water oxygen content in, for example, the water reclamation pond.

In still yet another embodiment, the gas saturated liquid (e.g., oxygen saturated liquid) provided by any one of the previous machines or processes can be stored in a storage container (e.g., a tank, cylinder, bottle). The stored liquid is preferably stored without a head space above the liquid in the container. In one instance, the liquid is stored in a bladder that fills and/or expands with the addition of the gas liquid admixture. In another instance, the non-gas-liquid admixture filled space within a container is occupied by a compressible, or pressure regulated bladder thereby eliminating open head space. Preferably, the storage of the gas liquid mixture provided by any one of the previous machines of processes is essentially free of a liquid gas interface. Specific examples of storage containers and the storage of the gas liquid mixture can include containers (e.g., silos, tanks or towers) with a bladder, where the gas liquid mixture is either within the bladder or where a head space is displaced by a bladder. In these examples, pressure about the bladder or provided by the bladder can be used to displace the gas liquid mixture from the container.

In another embodiment, the nanobubble fluid stream is admixed with produced water that includes hydrocarbons (e.g., oil and/or oil-water emulsions). The nanobubble fluid stream preferably mixes with the produced water without macro-bubble formation. In certain embodiments, the admixing of the nanobubble fluid stream and the produced water affects the separation of the hydrocarbons from the admixture. Preferably, the method is effective for separating at least 90 wt. % of the total weight of the hydrocarbons in the produced water. More preferably, the method is effective for separating at least 91 wt. %, 92 wt. %, 93 wt. %, 94 wt. %, 95 wt. %, 96 wt. %, 97 wt. %, 98 wt. %, or 99 wt. % of the total weight of hydrocarbons in the produced water. Herein, separating the hydrocarbons from the produced water includes the floatation or phase separation of a hydrocarbon layer from a water layer sufficient that a treated water product can be recovered that includes less than 10 wt. %, 9 wt. %, 8 wt. %, 7 wt. %, 6 wt. %, 5 wt. %, 4 wt. %, 3 wt. %, 2 wt. %, or 1 wt. % of the total weight of the hydrocarbons in the (untreated) produced water. Preferably, a treated water product can be recovered (e.g., by a phase separation technique like decantation) that has a hydrocarbon content of less than 0.1 wt. %, 0.01 wt. % or 0.001 wt. % based on the total weight of the treated water. In one instance, the method affects (decreases) the density of the produced water and the hydrocarbons included therein. Notably, the produced water includes a density ratio of the hydrocarbon (or hydrocarbon admixture) density ($\rho^{ph}$) to the water density (inclusive of solutes, e.g., salts and other water soluble species) ($\rho^{pw}$) and the treated water product includes a density ratio of the treated hydrocarbon density ($\rho^{th}$) to the treated water density ($\rho^{tw}$). Preferably, the density ratio of the produced water is greater than the density ratio of the treated water product, as shown by the following equation:

$$\frac{(\rho^{ph})}{(\rho^{pw})} > \frac{(\rho^{th})}{(\rho^{tw})}$$

More preferably, the equation is met by decreasing the density of the treated hydrocarbon by a greater amount than the density of the treated water decreases. That is, the admixing of the nanobubble fluid stream with the produced water, preferably, yields a treated water product where the density of the hydrocarbons therein decreases by a larger percentage than the density of the water. In another instance the produced water further includes dissolved salts (e.g., dissolved calcium salts from the admixture of water (e.g., fracking water) and shale). In this instance, the addition of the nanobubble fluid stream can aid or cause the precipitation of materials from the treated water product. Preferably, the addition of the nanobubble fluid stream causes, facilitates, or aids the precipitation of salts that include calcium, sodium, and/or magnesium cations. Even more preferably, the addition of the nanobubble fluid steam facilitates the separation of both hydrocarbons and salts from the treated water.

In still another embodiment, the nanobubble fluid stream is admixed with produced water that includes suspended solids (e.g., sands and/or clays). The nanobubble fluid stream preferably mixes with the produced water without macro-bubble formation. In certain embodiments, the admixing of the nanobubble fluid stream and the produced water affects the separation of the suspended from the admixture. In one instance, the nanobubble fluid stream mixes with a produced water that includes suspended solids, affects the separation of oils, paraffins, asphaltenes, and/or bacteria from the solids surface, and facilitates the settling/precipitation of the solids and the floatation/separation of the oils, paraffins, asphaltenes, and/or bacteria from produced water.

In yet another embodiment, the nanobubble fluid stream is admixed with the produced water and affects the pH of the water. For example, the nanobubble fluid stream can increase or decrease the pH of the produced water. In certain circumstances, the decrease in the pH of the produced water can facilitate the separation of materials from the produced water, for example, by precipitation, polymerization, or effervescence (e.g., acidification of NaSH solutions leads to the effervescence or elimination of $H_2S$). In other circumstances, the increase in the pH of the produced water can facilitate the separation of materials from the produced water, for example, by coagulation, anionic polymerization, or salt formation and crystallization.

The foregoing description is given for clearness of understanding only, and no unnecessary limitations should be understood therefrom, as modifications within the scope of the invention may be apparent to those having ordinary skill in the art.

What is claimed:

1. A liquid-gas saturation machine comprising:
    a pressure vessel that includes,
        above a mid-line, a gas nozzle adapted for the addition of a gas to an interior volume of the pressure vessel and a liquid atomizer adapted for the addition of a liquid to the interior volume of the pressure vessel;
        below the mid-line, a fluid outlet positioned above a bottom of the pressure vessel and a clean-out port positioned at or adjacent to the bottom of the pressure vessel; and
    a flow path fluidly connected to the fluid outlet, the flow path including a plurality of alternating flow characteristic regions;
    wherein the alternating flow characteristic regions are laminar flow regions and turbulent or transitional flow regions;
    wherein the alternating flow characteristic regions are distinguished by a Reynolds number value of at least about 500; and
    wherein the flow path is provided by a tube that has an internal diameter of about 1 mm to about 25 mm.

2. The machine of claim 1, wherein the tube includes an inlet section fluidly connected to the fluid outlet, an alternating series of bent and straight sections fluidly connected to the inlet section, and an outlet section fluidly connected to the alternating series of bent and straight sections;
    wherein the bent section is adapted to provide turbulent or transitional flow, and the straight section is adapted to provide laminar flow; and
    wherein the bent section provides a bent section flow Reynolds number, the straight section provides a straight section flow Reynolds number, and where the bent section flow Reynolds number is at least 500 greater than the straight section flow Reynolds number.

3. The machine of claim 2, wherein the inlet section and the outlet section are parallel.

4. The machine of claim 2, wherein the bent sections affect a change in direction of a flow though adjoining laminar sections of about 60 to about 270 degrees.

5. The machine of claim 1, wherein the flow path includes at least 5 alternating flow characteristic regions.

6. The machine of claim 1, wherein the flow path is provided by a tube that has an approximately constant internal diameter.

7. The machine of claim 1, wherein the tube has an internal diameter of about 1 mm to about 2 mm.

8. The machine of claim 1, wherein the tube has an internal diameter of about 1 mm to about 25 mm and wherein the internal diameter alternates between a first internal diameter and a second internal diameter.

9. A liquid-gas saturation machine comprising:
    a pressure vessel fluidly connected to a tube which provides a flow path that has a plurality of alternating flow characteristic regions;
    the tube that having an internal diameter of about 1 mm to about 25 mm.

10. The machine of claim 9 further comprising a plurality of tubes in a parallel arrangement, each providing a flow path that has a plurality of alternating flow characteristic regions; and having an internal diameter of about 1 mm to about 25 mm.

11. The machine of claim 10, wherein the plurality of tubes includes at least 3 tubes.

12. The machine of claim 9, wherein the tube includes an alternating series of bent and straight sections; the bent sections adapted to provide turbulent or transitional flow, and the straight sections adapted to provide laminar flow, wherein the bent sections affect a change in direction of a flow though adjoining laminar sections of about 60 to about 270 degrees.

13. The machine of claim 9, wherein the tube is linear and has an internal diameter which alternates between a first internal diameter and a second internal diameter; wherein the alternating flow characteristic regions coincide with the alternating internal diameter.

14. A process comprising:
  providing a pressurized fluid stream that includes a mixture of a gas and a liquid; and then
  passing the pressurized fluid stream through a flow path that includes a plurality of alternating and equally-spaced laminar flow regions and turbulent flow regions; and
  wherein the flow path is provided by a tube that has an internal diameter of about 1 mm to about 25 mm.

15. The process of claim 14 further comprising dividing the pressurized fluid stream into a plurality of fluid streams and passing each through a flow path that includes a plurality of equally-spaced laminar flow regions and turbulent flow regions.

16. The process of claim 14, wherein the pressurized fluid stream is a saturated mixture of the gas and the liquid which is substantially free of bubbles.

17. The process of claim 14, wherein the liquid is water; and wherein the gas is selected from the group consisting of oxygen, ozone, nitrogen, carbon dioxide, carbon monoxide, hydrogen, methane, ethane, ethylene, propane, propene, butane, n-butene, iso-butene, and a mixture thereof.

18. The process of claim 14 further comprising subjecting the fluid stream to at least 5 of alternating flow regions and then providing the fluid stream to a reservoir solution; wherein the liquid is water, and wherein the reservoir solution is at least 75 wt. % water.

19. The process of claim 18, wherein the fluid stream has a temperature and wherein the reservoir has a temperature; further comprising equilibrating the temperature of the fluid stream and the temperature of the reservoir such that a temperature differential between the fluid stream and the reservoir at a location where the fluid stream is provided to the reservoir is less than about 5° C.

* * * * *